United States Patent
Sanchez Rola

(10) Patent No.: US 12,361,123 B1
(45) Date of Patent: Jul. 15, 2025

(54) SYSTEMS AND METHODS FOR DETECTING CROSS-SITE LEAKS AND RESTRICTING EXECUTION TIMING

(71) Applicant: GEN DIGITAL INC., Tempe, AZ (US)

(72) Inventor: Iskander Sanchez Rola, Antibes (FR)

(73) Assignee: Gen Digital Inc., Tempe, AZ (US)

(*) Notice: Subject to any disclaimer, the term of this patent is extended or adjusted under 35 U.S.C. 154(b) by 225 days.

(21) Appl. No.: 18/157,116

(22) Filed: Jan. 20, 2023

(51) Int. Cl.
*G06F 21/55* (2013.01)

(52) U.S. Cl.
CPC ...... *G06F 21/554* (2013.01); *G06F 2221/033* (2013.01)

(58) Field of Classification Search
CPC .......................... G06F 21/554; G06F 2221/033
USPC .......................................................... 726/23
See application file for complete search history.

(56) References Cited

U.S. PATENT DOCUMENTS

| | | | | |
|---|---|---|---|---|
| 8,698,605 | B2* | 4/2014 | Kim | H04L 9/003 713/168 |
| 10,075,456 | B1* | 9/2018 | Morparia | H04L 63/1425 |
| 10,592,662 | B1* | 3/2020 | Sobel | G09C 1/00 |
| 2012/0255005 | A1* | 10/2012 | Yoshimi | G06F 21/72 726/23 |
| 2014/0095883 | A1* | 4/2014 | Kirillov | H04L 9/0891 713/176 |
| 2014/0123139 | A1* | 5/2014 | Fine | G06F 21/556 718/1 |
| 2015/0244738 | A1* | 8/2015 | Lu | G06F 21/56 726/23 |
| 2015/0350239 | A1* | 12/2015 | Kruglick | G06F 9/45558 726/23 |
| 2015/0363593 | A1* | 12/2015 | Joye | G06F 21/31 726/18 |
| 2017/0163663 | A1* | 6/2017 | Gopalakrishnan | H04L 63/1483 |
| 2019/0327076 | A1* | 10/2019 | Weber | H04L 9/003 |
| 2022/0058353 | A1* | 2/2022 | Kaufmann | H04L 63/1416 |
| 2023/0155817 | A1* | 5/2023 | Koren | H04L 9/0825 713/171 |
| 2023/0176982 | A1* | 6/2023 | El Majihi | G06F 12/0864 726/22 |
| 2023/0214539 | A1* | 7/2023 | Glinka | G06F 21/85 726/36 |
| 2024/0291863 | A1* | 8/2024 | Cohen | H04L 63/1483 |

OTHER PUBLICATIONS

Mao et al., "Toward Exposing Timing-Based Probing Attacks in Web Applications", Feb. 25, 2017, NLM (Year: 2017).*

* cited by examiner

*Primary Examiner* — Thanh T Le
(74) *Attorney, Agent, or Firm* — Greenberg Traurig, LLP

(57) ABSTRACT

The disclosed computer-implemented method for detecting cross-site leaks and restricting execution timing may include detecting, by at least one processor, one or more cross-site leak candidates. The method may additionally include determining, by the at least one processor, that at least one of the one or more cross-site leak candidates is related to one or more timers. The method may also include restricting, by the at least one processor, at least one of accuracy or precision of the one or more timers in response to the determination. Various other methods, systems, and computer-readable media are also disclosed.

20 Claims, 6 Drawing Sheets

SYSTEMS AND METHODS FOR DETECTING CROSS-SITE LEAKS AND RESTRICTING EXECUTION TIMING

BACKGROUND

The same origin policy (SOP) is central to the web browser security model. The SOP is a rule that defines two uniform resource locators (URLs) as having the same origin if their protocol, port (if specified), and host are the same. The SOP rule additionally defines that a website from any origin can freely send get, post, head, and options requests to any other origin, and requires that the request include the user's cookies (e.g., including session ID) to that origin. The SOP rule also requires that, while it is possible to send requests, a website from one origin cannot directly read responses from another origin. A website can still consume resources from those responses (e.g., by executing scripts, using fonts/styles, or displaying images), and a website from one origin can, if it gets a handle to a window, have restricted access to that window, including changing a URL of the window.

Many cross-site leaks occur through timing attacks, which exploit the fact that browsers make it easy to time cross-domain requests. Timing such requests makes it easy for a malicious website to differentiate between responses. For example, suppose there is a search application program interface (API) for patients to find their own medical records. If the patient has diabetes and searches for "diabetes," the server returns data, and if the patient does not have diabetes, the API returns an empty java script object notation (JSON). Generally, the former request would take a longer time, making it possible for a malicious website to clock requests to the "diabetes" URL and determine whether or not the user has diabetes.

In recent years, cross-site leaks have become a particularly important problem for any web user who cares about privacy. Attackers are able to infer sensitive information of users on websites, bypassing the SOP that protects data from being accessed through cross-origin sources. The inference of data can lead, for example, to determining interests, detecting interactions with other users, or even completely breaking online anonymity.

SUMMARY

As will be described in greater detail below, the present disclosure describes various systems and methods for detecting cross-site leaks and restricting execution timing.

In one example, a method for detecting cross-site leaks and restricting execution timing may include detecting, by at least one processor, one or more cross-site leak candidates. The method may additionally include determining, by the at least one processor, that at least one of the one or more cross-site leak candidates is related to one or more timers. The method may also include restricting, by the at least one processor, at least one of accuracy or precision of the one or more timers in response to the determination.

Another example method can be the previous example method, wherein detecting the one or more cross-site leak candidates includes implementing one or more hooks into one or more calls, linking at least one of the one or more calls with a set of scripts, verifying that two or more concurrent calls of the one or more calls are made within the set of scripts that modify one or more controllable variable values, and identifying the set of scripts as a cross-site leak candidate in response to the verification.

Another example method can be any of the previous example methods, wherein implementing one or more hooks into one or more calls includes implementing one or more hooks into one or more calls generated directly from a script and/or implementing one or more hooks into one or more indirectly triggered calls.

Another example method can be any of the previous example methods, wherein linking at least one of the one or more calls with the set of scripts includes linking an individual call of the one or more calls, linking at least one group of the one or more calls, and/or linking based on a resource tree and inclusion of the set of scripts therein.

Another example method can be any of the previous example methods, wherein determining that at least one of the one or more cross-site leak candidates is related to one or more timers includes detecting that one or more requests made by the one or more cross-site leak candidates occur within a predetermined window of time with respect to the one or more timers and/or detecting that one or more responses to one or more requests made by the one or more cross-site leak candidates are being timed when processed with one or more functions.

Another example method can be any of the previous example methods, wherein restricting at least one of accuracy or precision of the one or more timers includes adding delay to the one or more timers in a manner that avoids usage of timing information to exfiltrate data.

Another example method can be any of the previous example methods, wherein adding delay to the one or more timers includes randomly determining the delay added to the one or more timers.

In one embodiment, a system for detecting cross-site leaks and restricting execution timing may include at least one physical processor and physical memory that includes computer-executable instructions that, when executed by the physical processor, cause the physical processor to detect one or more cross-site leak candidates, determine that at least one of the one or more cross-site leak candidates is related to one or more timers, and restrict at least one of accuracy or precision of the one or more timers in response to the determination.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to detect one or more cross-site leak candidates, determine that at least one of the one or more cross-site leak candidates is related to one or more timers, and restrict at least one of accuracy or precision of the one or more timers in response to the determination.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
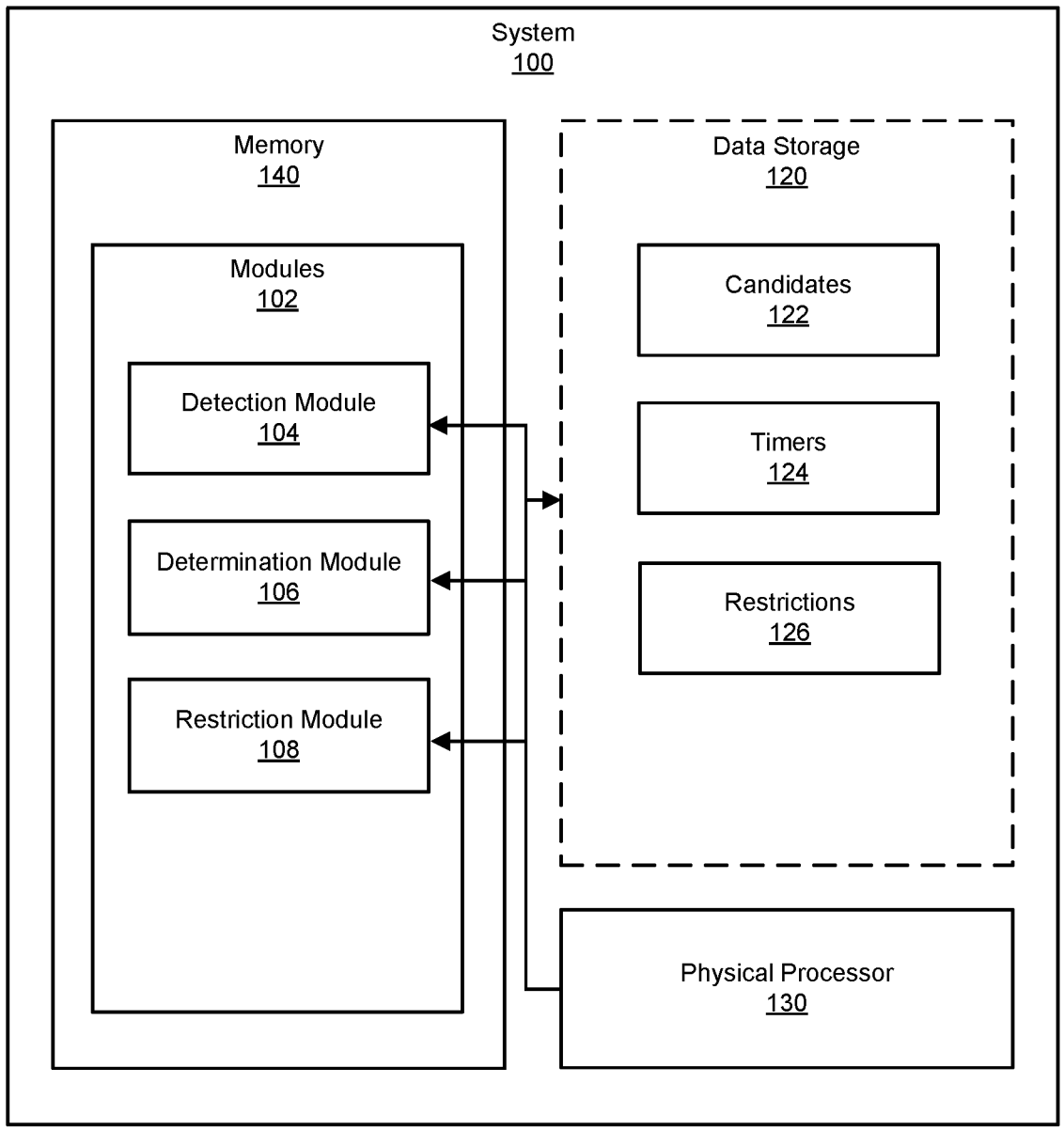
FIG. 1 is a block diagram of an example system for detecting cross-site leaks and restricting execution timing.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting cross-site leaks and restricting execution timing. For example, the systems and methods disclosed herein may detect one or more cross-site leak candidates, determine that at least one of the one or more cross-site leak candidates is related to one or more timers, and restrict at least one of accuracy or precision of the one or more timers in response to the determination. By restricting execution timing in response to a determination that cross-site leaks are occurring, the disclosed systems and methods can thwart many cross-site leaks while avoid unnecessarily degrading website performance when leaks are not occurring.

Figure 2:
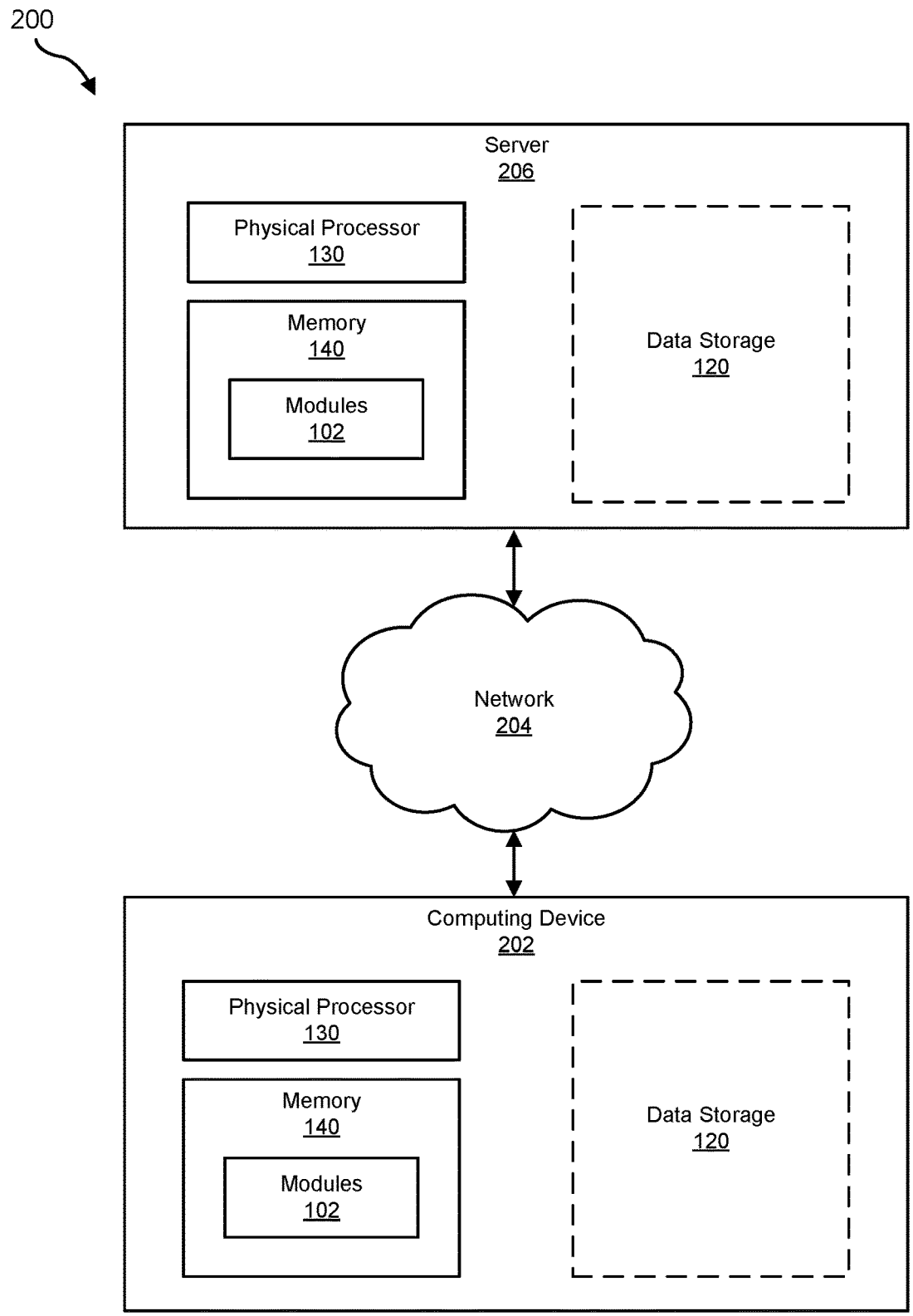
FIG. 2 is a block diagram of an additional example system for detecting cross-site leaks and restricting execution timing.

The following will provide, with reference to FIGS. 1-2, detailed descriptions of example systems for detecting cross-site leaks and restricting execution timing. Detailed descriptions of corresponding computer-implemented methods will also be provided in connection with FIGS. 3 and 4. In addition, detailed descriptions of an example computing system and network architecture capable of implementing one or more of the embodiments described herein will be provided in connection with FIGS. 5 and 6, respectively.

FIG. 1 is a block diagram of an example system 100 for detecting cross-site leaks and restricting execution timing. As illustrated in this figure, example system 100 may include one or more modules 102 for performing one or more tasks. As will be explained in greater detail below, modules 102 may include a detection module 104, a determination module 106, and a restriction module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting cross-site leaks and restricting execution timing. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more instances of stored data, such as data storage 120. Data storage 120 generally represents any type or form of stored data. In one example, data storage 120 may include databases, spreadsheets, tables, lists, matrices, trees, or any other type of data structure. Examples of data storage 120 include, without limitation, candidates 122, timers 124, and/or restrictions 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect cross-site leaks and restrict execution timing. For example, and as will be described in greater detail below, one or more of modules 102 may cause computing device 202 and/or server 206 to detect one or more cross-site leak candidates, determine that at least one of the one or more cross-site leak candidates is related to one or more timers, and restrict at least one of accuracy or precision of the one or more timers in response to the determination.

Computing device 202 generally represents any type or form of computing device capable of reading computer-executable instructions. For example, computing device may be any computer capable of receiving, processing, and storing data. In some examples, computing device may be a user device capable of employing web browsing functionality. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of receiving, processing, and storing data. In some examples, the computing device may be a server that hosts web pages that it serves to client devices. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
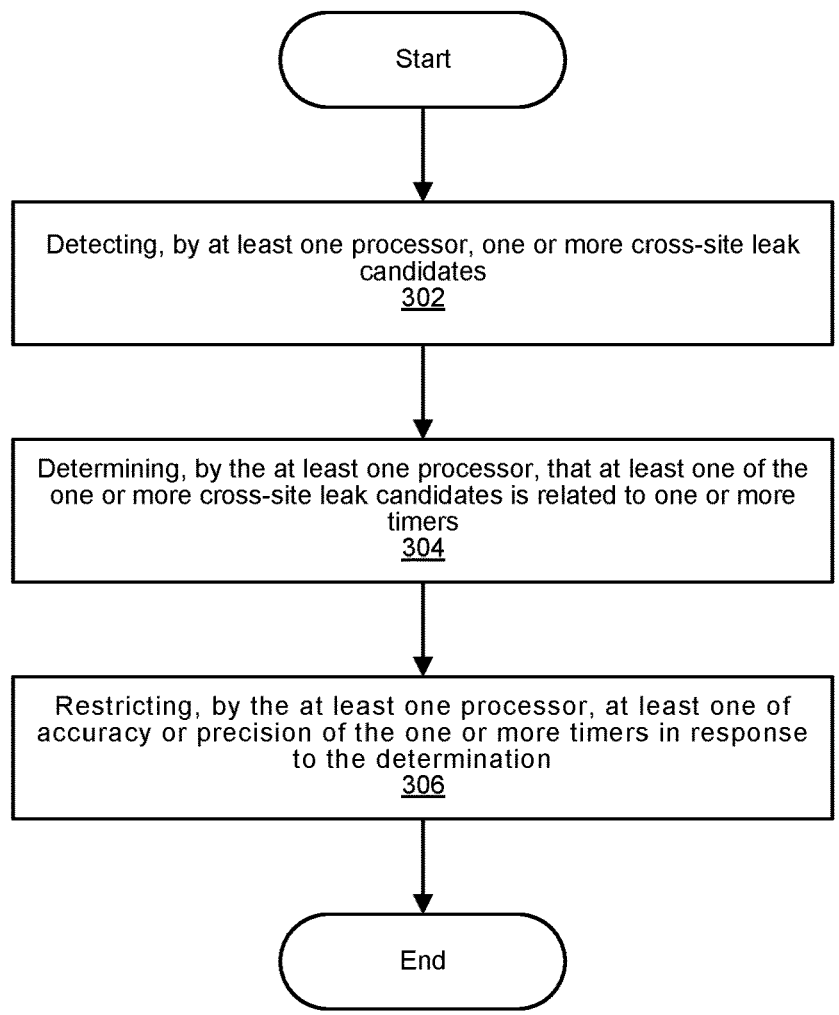
FIG. 3 is a flow diagram of an example method for detecting cross-site leaks and restricting execution timing.

FIG. 3 is a flow diagram of an example computer-implemented method 300 for detecting cross-site leaks and restricting execution timing. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect candidates. For example, detection module 104 may, as part of computing device 202 in FIG. 2, detect, by at least one processor, one or more cross-site leak candidates.

The term "cross-site leak candidates," as used herein, generally refers to a set of scripts. For example, and without limitation, cross-site leak candidates can refer to scripts that make concurrent (i.e., semi-concurrent) calls that modify controllable variable values (e.g., certain JavaScript controllable variable values.

The systems described herein may perform step 302 in a variety of ways. For example, and referring to FIG. 4, an example method 400 of detecting cross-site leak candidates is shown. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

Figure 4:
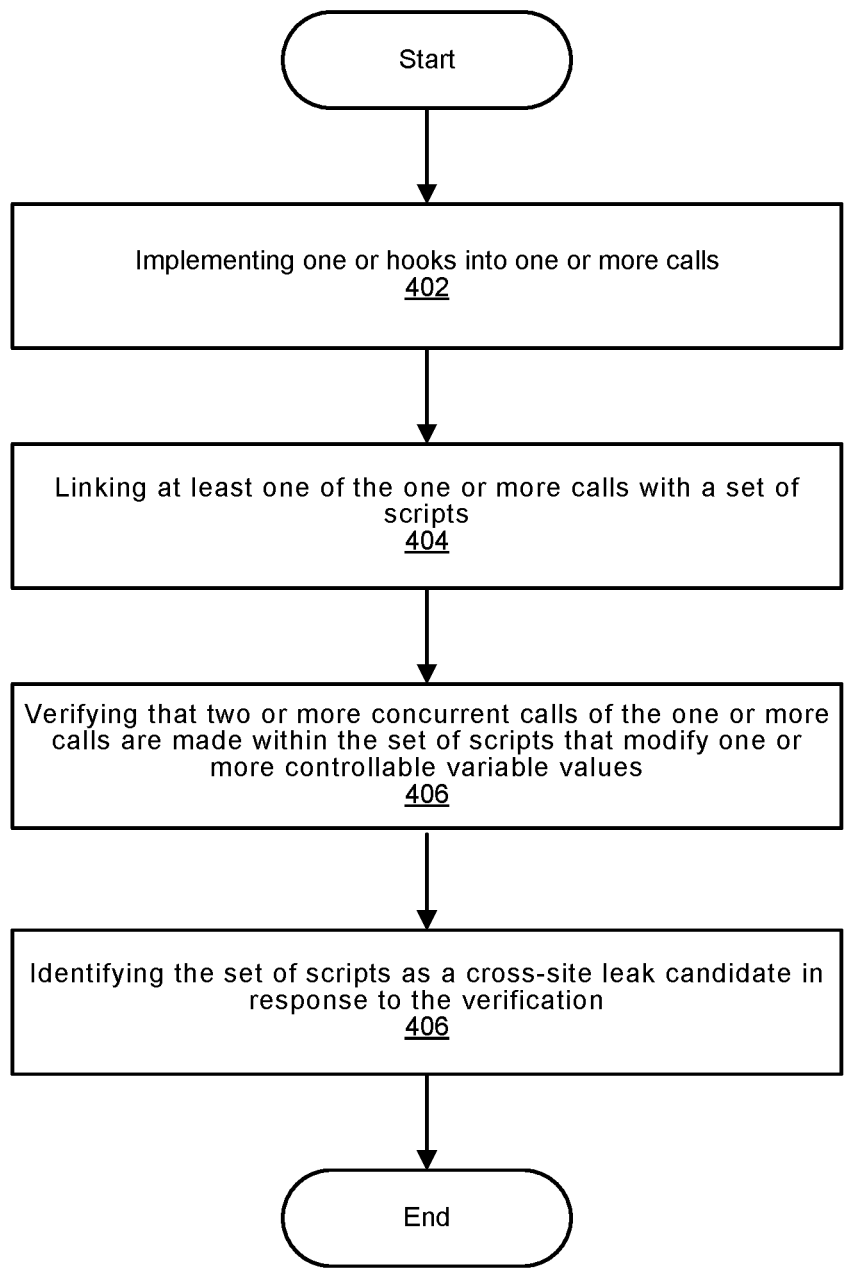
FIG. 4 is a flow diagram illustrating an example method for detecting cross-site leak candidates.

As illustrated in FIG. 4, at step 402 one or more of the systems described herein may implement hooks. For example, detection module 104 may, as part of computing device 202 in FIG. 2, implement one or more hooks into one or more calls.

The term "hooks," as used herein, generally refers to a range of techniques used to alter or augment the behavior of an operating system, of applications, or of other software components by intercepting function calls or messages or events passed between software components. Code that handles such intercepted function calls, events, or messages is called a "hook," and "hooking" can also be referred to as "instrumenting." Hooking a function may be performed by overwriting the function with a user-defined function that performs the same functionality, but with additional instructions that allow detection and/or monitoring of calls, events, and/or messages.

The term "calls," as used herein, generally refers to an expression that passes control and arguments (if any) to a function. Example calls may include, without limitation, calls to timing methods/functions, "fetch API," "XMLHttpRequest," "<iframe src>," "window.open," "http-equiv='refresh,'" "performance.now," "date.getTime," "console.time," "JSON.parse," "<video>," etc.

The systems described herein may perform step 402 in a variety of ways. In one example, detection module 104 may, as part of computing device 202 in FIG. 2, implement one or more hooks into one or more calls (e.g., timing methods/functions) by implementing one or more hooks into one or more calls generated directly from a script and/or implementing one or more hooks into one or more indirectly triggered calls. In some examples, detection module 104 may, as part of computing device 202 in FIG. 2, instrument all correspondent functions related to request generations. For example, detection module 104 may, as part of computing device 202 in FIG. 2, can hook into "fetch API" or "XMLHttpRequest" for calls generated directly from JavaScript, and "<iframe src>," "window.open," and/or "http-equiv='refresh'" for indirectly triggered calls.

At step 404, one or more of the systems described herein may link calls with scripts. For example, detection module 104 may, as part of computing device 202 in FIG. 2, link at least one of the one or more calls with a set of scripts.

The systems described herein may perform step 404 in a variety of ways. In one example, detection module 104 may, as part of computing device 202 in FIG. 2, link at least one of the one or more calls with the set of scripts by linking an individual call of the one or more calls, linking at least one group of the one or more calls, and/or linking based on a resource tree and inclusion of the set of scripts therein.

At step 406, one or more of the systems described herein may verify modification of controllable variable values. For example, detection module 104 may, as part of computing device 202 in FIG. 2, verify that two or more concurrent calls of the one or more calls are made within the set of scripts that modify one or more controllable variable values.

The term "controllable variable values," as used herein, generally refers to variable values of scripts that are subject to modification/control. For example, and without limitation, controllable variable values can include script (e.g., JavaScript) controllable variable values such as "URL parameters" and/or "HTTP headers."

The systems described herein may perform step 406 in a variety of ways. In one example, detection module 104 may, as part of computing device 202 in FIG. 2, verify if concurrent (i.e., semi-concurrent) calls are being made within a linked set of scripts that modify certain JavaScript controllable variable values, such as "URL parameters" or "HTTP headers."

At step 408, one or more of the systems described herein may identify scripts as candidates. For example, detection module 104 may, as part of computing device 202 in FIG. 2, identify the set of scripts as a cross-site leak candidate in response to the verification.

The systems described herein may perform step 408 in a variety of ways. In one example, detection module 104 may, as part of computing device 202 in FIG. 2, mark the linked set of scripts as a candidate in response to verifying, in step 406, that concurrent (i.e., semi-concurrent) calls are being made within a linked set of scripts that modify certain JavaScript controllable variable values, such as "URL parameters" or "HTTP headers."

Returning to FIG. 3, at step 304 one or more of the systems described herein may determine relationships. For example, determination module 106 may, as part of computing device 202 in FIG. 2, determine, by the at least one processor, that at least one of the one or more cross-site leak candidates is related to one or more timers.

The term "timers," as used herein, generally refers to functions that measure execution time. For example, and without limitation, timers may include "performance.now," "date.getTime," and/or "console.time."

The systems described herein may perform step 304 in a variety of ways. In one example, determination module 106 may, as part of computing device 202 in FIG. 2, determine that at least one of the one or more cross-site leak candidates is related to one or more timers at least in part by detecting that one or more requests made by the one or more cross-site leak candidates occur within a predetermined window of time (e.g., within 100 ms, within 200 ms, etc.) with respect to the one or more timers. Alternatively or additionally, determination module 106 may, as part of computing device 202 in FIG. 2, determine that at least one of the one or more cross-site leak candidates is related to one or more timers at least in part by detecting that one or more responses to one or more requests made by the one or more cross-site leak candidates are being timed when processed with one or more functions. In some examples, determination module 106 may, as part of computing device 202 in FIG. 2, check if the candidates are related to any timers (e.g., hooked functions), such as "performance.now," "date.getTime," and/or "console.time." Some of these examples may perform the check with respect to request timing and/or response timing. For request timing, determination module 106 may, as part of computing device 202 in FIG. 2, check if any of the previously hooked timing methods are linked to the candidates (e.g., based on timing just before and/or after the request is made and received), indicating that the script(s) are using this information to infer a private user state. For response timing, determination module 106 may, as part of computing device 202 in FIG. 2, check if the responses obtained (e.g., "response.json" or "xhr.response") are being timed when processed with functions like "JSON.parse" and/or "<video>," which can also be hooked calls/methods/functions. This technique additionally can be used, for example, to determine the size of a cross-origin response.

At step 306 one or more of the systems described herein may restrict execution timing. For example, restriction module 108 may, as part of computing device 202 in FIG. 2, restrict, by the at least one processor, at least one of accuracy or precision of the one or more timers in response to the determination.

The term "restrict execution timing," as used herein, generally refers to decreasing accuracy and/or precision of execution timing measurements. For example, and without limitation, restricting execution timing can include adding delay (e.g., a random amount of delay) to execution timing.

The systems described herein may perform step 306 in a variety of ways. In one example, restriction module 108 may, as part of computing device 202 in FIG. 2, restrict accuracy and/or precision of the one or more timers at least in part by adding delay to the one or more timers in a manner that avoids usage of timing information to exfiltrate data. In some examples, restriction module 108 may, as part of computing device 202 in FIG. 2, add delay to the one or more timers at least in part by randomly determining the delay (e.g., in a range of 0-100 ms) added to the one or more timers. Randomizing the delay in this fashion assists in preventing attackers form reliably determining a difference in timing of responses of different types (e.g., return of an empty JSON can take longer than a return of user data in some, but not all, instances).

As set forth above, disclosed systems and methods can thwart many cross-site leaks while avoiding unnecessarily degrading website performance when such leaks are not occurring. The disclosed systems and methods accomplish this improvement by determining when cross-site leaks are occurring and restricting execution timing in response to (e.g., only when) it is determined that cross site leaks are occurring. In order to achieve this functionality, the disclosed systems and methods may detect one or more cross-site leak candidates, determine that at least one of the one or more cross-site leak candidates is related to one or more timers, and restrict at least one of accuracy or precision of the one or more timers in response to the determination. In detecting the candidates, the disclosed systems and methods may implement one or more hooks into one or more calls, link at least one of the one or more calls with a set of scripts, verify that two or more concurrent calls of the one or more calls are made within the set of scripts that modify one or more controllable variable values, and identify the set of scripts as a cross-site leak candidate in response to the verification. In determining relationship to timers, the disclosed systems and methods may detect that one or more requests made by the one or more cross-site leak candidates occur within a predetermined window of time with respect to the one or more timers, and/or detect that one or more responses to one or more requests made by the one or more cross-site leak candidates are being timed when processed with one or more functions. In this way, the disclosed systems and methods can thwart many cross-site leaks while avoiding unnecessarily degrading website performance when such leaks are not occurring.

Figure 5:
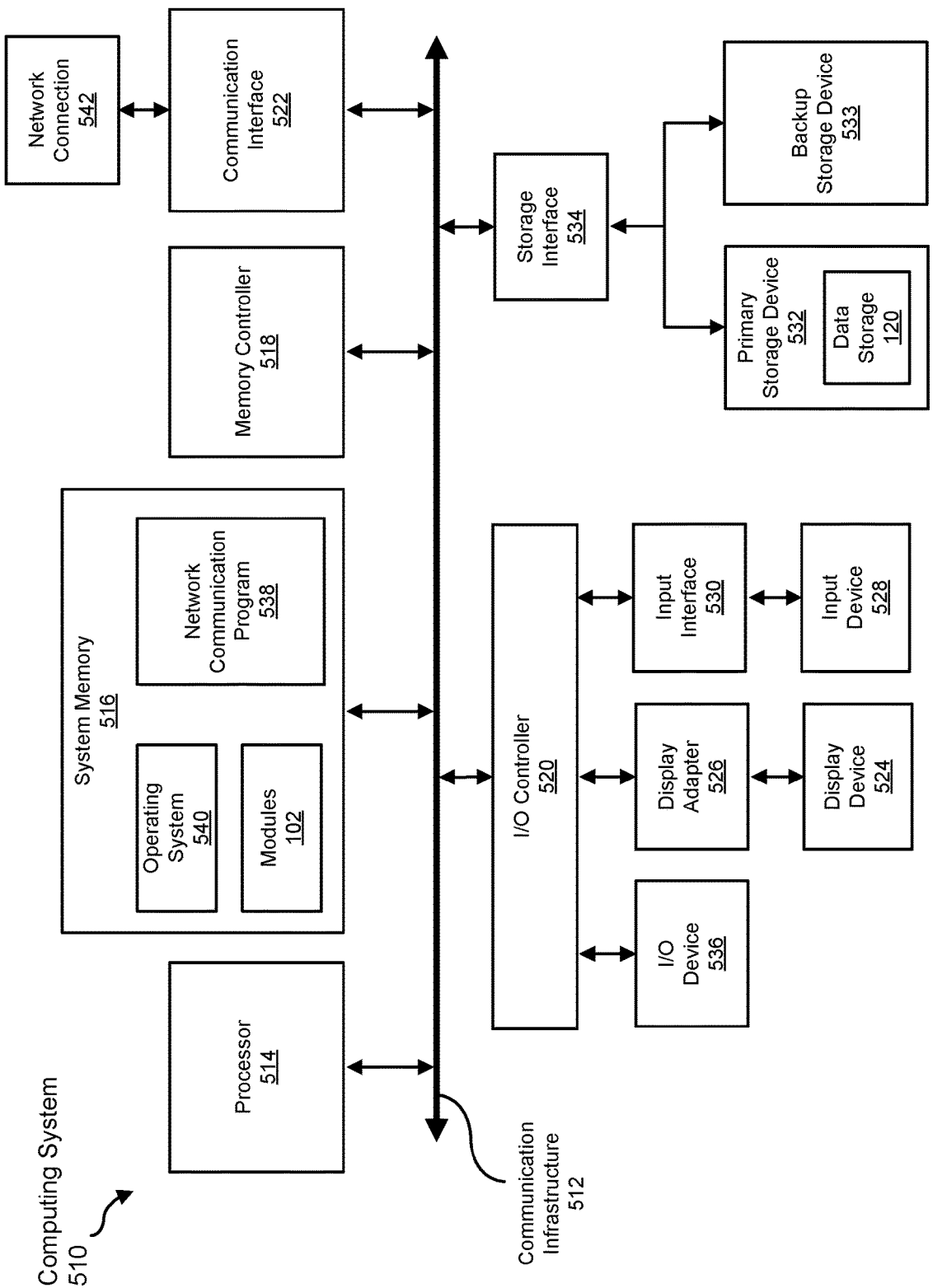
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, data storage 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
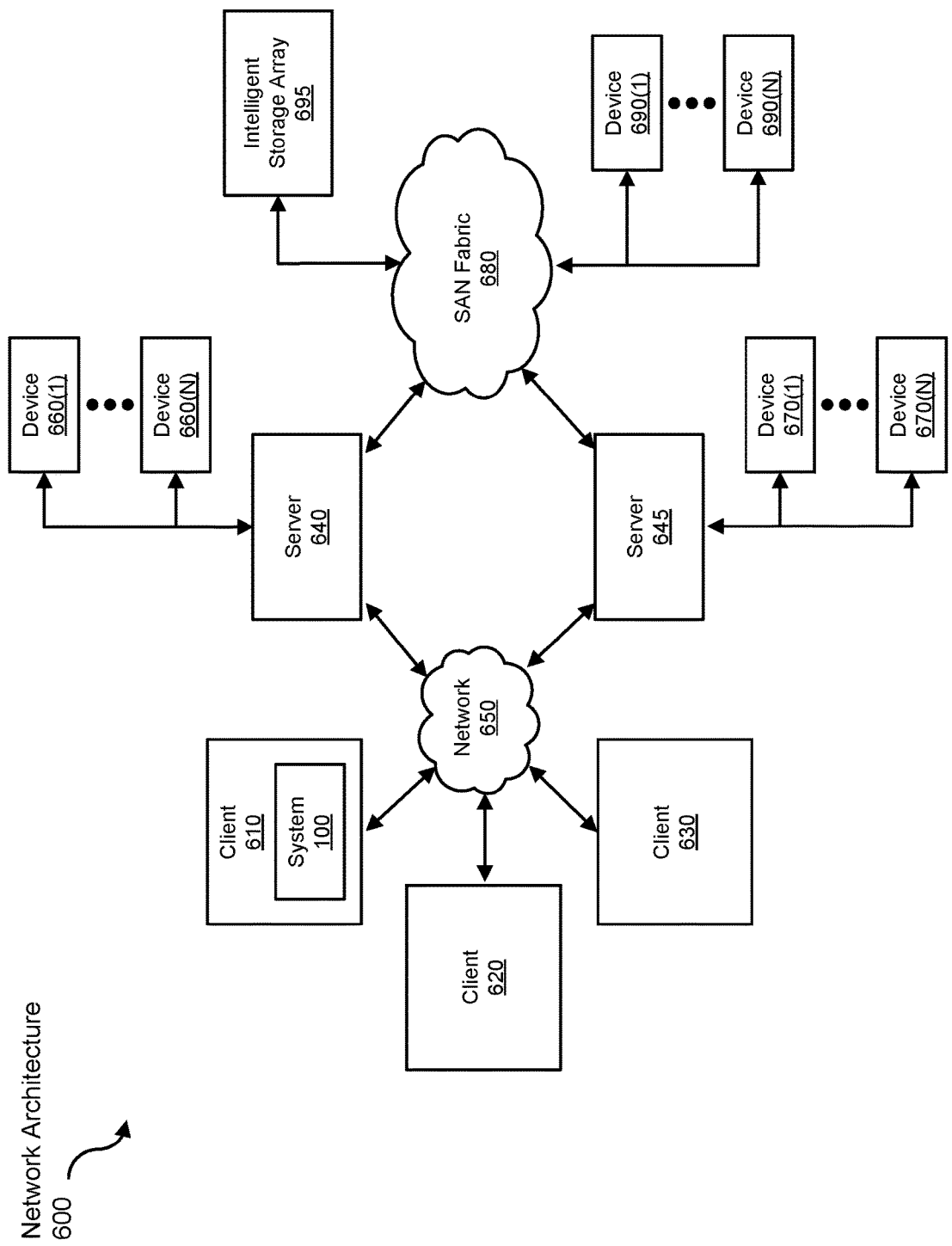
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting cross-site leaks and restricting execution timing.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive requests and/or responses to be transformed, transform the requests and/or responses, output a result of the transformation to detect cross-site leaks, and use the result of the transformation to restrict execution timing. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting cross-site leaks and restricting execution timing, at least a portion of the method being performed by a computing device comprising at least one processor, the method comprising:
   detecting, by at least one processor, one or more cross-site leak candidates at least in part by verifying that two or more calls are made within a linked set of scripts;
   determining, by the at least one processor, that at least one of the one or more cross-site leak candidates is related to one or more timers; and
   restricting, by the at least one processor, at least one of accuracy or precision of the one or more timers in response to the determination.

2. The method of claim 1, wherein detecting the one or more cross-site leak candidates includes:
   implementing one or more hooks into one or more calls;
   linking at least one of the one or more calls with a set of scripts;
   verifying that the two or more calls are concurrent calls that are made within the linked set of scripts and that the two or more calls modify one or more controllable variable values; and
   identifying the set of scripts as a cross-site leak candidate in response to the verification.

3. The method of claim 2, wherein implementing one or more hooks into one or more calls includes at least one of:
   implementing one or more hooks into one or more calls generated directly from a script; or
   implementing one or more hooks into one or more indirectly triggered calls.

4. The method of claim 3, wherein linking at least one of the one or more calls with the set of scripts includes at least one of:
   linking an individual call of the one or more calls;
   linking at least one group of the one or more calls; or
   linking based on a resource tree and inclusion of the set of scripts therein.

5. The method of claim 1, wherein determining that at least one of the one or more cross-site leak candidates is related to one or more timers includes at least one of:
   detecting that one or more requests made by the one or more cross-site leak candidates occur within a predetermined window of time with respect to the one or more timers; or
   detecting that one or more responses to one or more requests made by the one or more cross-site leak candidates are being timed when processed with one or more functions.

6. The method of claim 1, wherein restricting at least one of accuracy or precision of the one or more timers includes:
adding delay to the one or more timers in a manner that avoids usage of timing information to exfiltrate data.

7. The method of claim 6, wherein adding delay to the one or more timers includes:
randomly determining the delay added to the one or more timers.

8. A system for detecting cross-site leaks and restricting execution timing, the system comprising:
at least one physical processor; and
physical memory comprising computer-executable instructions that, when executed by the physical processor, cause the physical processor to:
detect one or more cross-site leak candidates at least in part by verifying that two or more calls are made within a linked set of scripts;
determine that at least one of the one or more cross-site leak candidates is related to one or more timers; and
restrict at least one of accuracy or precision of the one or more timers in response to the determination.

9. The system of claim 8, wherein the instructions cause the at least one physical processor to detect the one or more cross-site leak candidates at least in part by:
implementing one or more hooks into one or more calls;
linking at least one of the one or more calls with a set of scripts;
verifying that the two or more calls are concurrent calls that are made within the linked set of scripts and that the two or more calls modify one or more controllable variable values; and
identifying the set of scripts as a cross-site leak candidate in response to the verification.

10. The system of claim 9, wherein the instructions cause the at least one physical processor to implement one or more hooks into one or more calls at least in part by at least one of:
implementing one or more hooks into one or more calls generated directly from a script; or
implementing one or more hooks into one or more indirectly triggered calls.

11. The system of claim 10, wherein the instructions cause the at least one physical processor to link at least one of the one or more calls with the set of scripts at least in part by at least one of:
linking an individual call of the one or more calls;
linking at least one group of the one or more calls; or
linking based on a resource tree and inclusion of the set of scripts therein.

12. The system of claim 8, wherein the instructions cause the at least one physical processor to determine that at least one of the one or more cross-site leak candidates is related to one or more timers at least in part by at least one of:
detecting that one or more requests made by the one or more cross-site leak candidates occur within a predetermined window of time with respect to the one or more timers; or
detecting that one or more responses to one or more requests made by the one or more cross-site leak candidates are being timed when processed with one or more functions.

13. The system of claim 8, wherein the instructions cause the at least one physical processor to restrict at least one of accuracy or precision of the one or more timers at least in part by:
adding delay to the one or more timers in a manner that avoids usage of timing information to exfiltrate data.

14. The system of claim 13, wherein the instructions cause the at least one physical processor to add delay to the one or more timers at least in part by:
randomly determining the delay added to the one or more timers.

15. A non-transitory computer-readable medium comprising one or more computer-executable instructions that, when executed by at least one processor of a computing device, cause the computing device to:
detect one or more cross-site leak candidates at least in part by verifying that two or more calls are made within a linked set of scripts;
determine that at least one of the one or more cross-site leak candidates is related to one or more timers; and
restrict at least one of accuracy or precision of the one or more timers in response to the determination.

16. The computer-readable medium of claim 15, wherein the instructions cause the computing device to detect the one or more cross-site leak candidates at least in part by:
implementing one or more hooks into one or more calls;
linking at least one of the one or more calls with a set of scripts;
verifying that the two or more calls are concurrent calls that are made within the linked set of scripts and that the two or more calls modify one or more controllable variable values; and
identifying the set of scripts as a cross-site leak candidate in response to the verification.

17. The computer-readable medium of claim 16, wherein the instructions cause the computing device to implement one or more hooks into one or more calls at least in part by at least one of:
implementing one or more hooks into one or more calls generated directly from a script; or
implementing one or more hooks into one or more indirectly triggered calls.

18. The computer-readable medium of claim 17, wherein the instructions cause the computing device to link at least one of the one or more calls with the set of scripts at least in part by at least one of:
linking an individual call of the one or more calls;
linking at least one group of the one or more calls; or
linking based on a resource tree and inclusion of the set of scripts therein.

19. The computer-readable medium of claim 15, wherein the instructions cause the computing device to determine that at least one of the one or more cross-site leak candidates is related to one or more timers at least in part by at least one of:
detecting that one or more requests made by the one or more cross-site leak candidates occur within a predetermined window of time with respect to the one or more timers; or
detecting that one or more responses to one or more requests made by the one or more cross-site leak candidates are being timed when processed with one or more functions.

20. The computer-readable medium of claim 15, wherein the instructions cause the computing device to restrict at least one of accuracy or precision of the one or more timers at least in part by:
adding delay to the one or more timers in a manner that avoids usage of timing information to exfiltrate data.

\* \* \* \* \*